April 5, 1932. W. J. MASON 1,852,888
GRAVITY CONTROLLER
Filed March 1, 1930
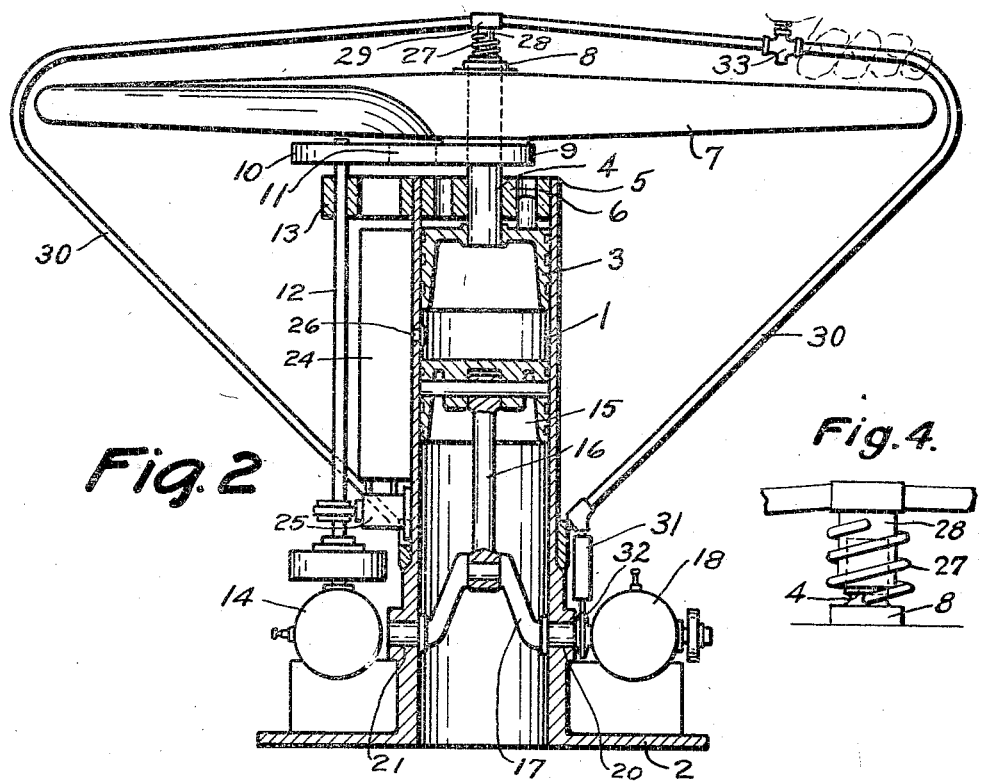
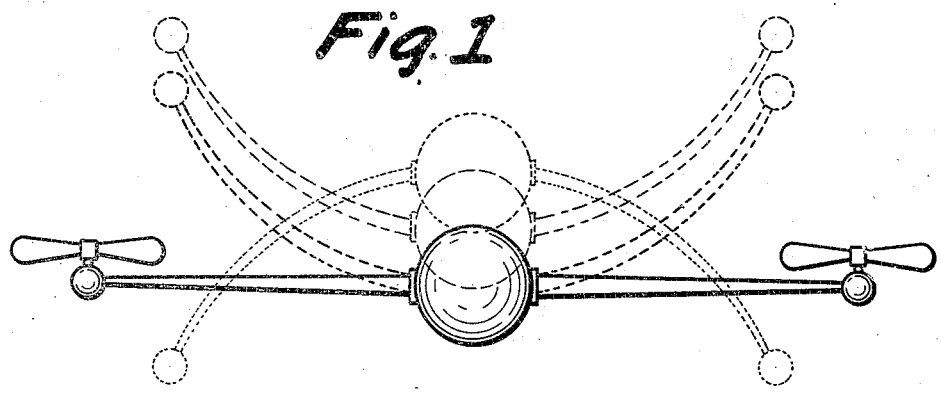
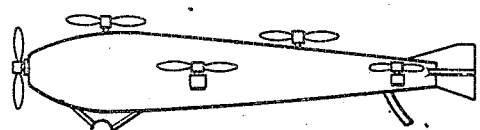
INVENTOR
William J. Mason
BY
Harry Bowen
ATTORNEY Patented Apr. 5, 1932

1,852,888

UNITED STATES PATENT OFFICE

WILLIAM J. MASON, OF SEATTLE, WASHINGTON

GRAVITY CONTROLLER

Application filed March 1, 1930. Serial No. 432,510.

The invention is the combination of the rotary motion of a propeller with an axial movement thereof to increase the efficiency.

The object of the invention is to imitate with mechanical means, the resultant upward force or reaction of the downward movement of the wings of a bird acting on air on the body of the bird which is suspended in the air.

The object of the invention may also be described as a mechanical means for converting the light swift pull of an ordinary aerial propeller into a second pull which is slower and proportionally stronger.

And the object may also be described as a mechanical device applying the principle of natural flight to lift or propel.

With these ends in view the invention embodies a heavier than air machine capable of securing a strong mid-air vertical lift which will also produce a strong pull on land, water, or in the air, or in any direction from the vertical. Therefore, the following is a description of the vertical movement only as this should suffice for all other directions.

Gravity has little force unless given time to accumulate it, and the functioning of this machine is to allow gravity little or no time to accumulate force.

Other features and advantages of the invention will appear from the following description, taken in connection with the drawings, wherein:

Figure 1 is a diagrammatical view intending to illustrate the principle of natural flight and show how, through the law of action and reaction, the small force of the wings acting through a great space is converted into a great force, the body acting through a small space. When this action and reaction is rapidly repeated the reaction of the light weight of air pulled down through a great space by the wings, add enough to the upward movement of the great force to enable it to overcome the force of gravity for the time in which this action and reaction occurs. It will be noted that this principle is followed in the functioning of my invention. It will be noted also that there are two elements functioning in the action of a birds wing, namely; the weight of the wing and its spread area. To facilitate their functioning mechanically they are separated in a manner embodying an important feature of the invention, which will hereinafter appear.

Figure 2 is a sectional elevation of the machine. It is obvious that it may be mounted in any suitable manner, upon the object to be moved. In this case the cylinder 1 is mounted on the base 2, and at the head end of the cylinder is a piston 3 mounted on a shaft 4. The shaft 4 extends beyond the cylinder head 5 in a bearing 6, and it will be noted that a propeller 7 is mounted to rotate thereon. A thrust bearing 8 holds the propeller on the shaft, and a pulley 9 is fastened to the propeller, and this is operated by a pulley 10 through a belt 11. The shaft 12 is held in a bearing 13 and rotated by the motor 14.

This provides means for rotating the propeller. At the lower end of the cylinder 1 is another piston 15 operated through a connecting rod 16 by a crankshaft 17 from a motor 18, and the crankshaft is mounted in bearings 20 and 21. An air tank 24, containing air maintained at a slight vacuum by a vacuum pump 25, is connected to the cylinder 1 at the point 26 through which a suction between the pistons 3 and 15 is maintained. As the propeller is rotated it exerts a constant upward pull a little greater than that of the suction, on the weighted piston 15 by way of the shaft 4 and the piston 3. The weighted piston 15 is driven by one impulse per cycle, delivered to it when it is at or near the forward end of its stroke, by a single or two opposed cylinder two cycle gasolene engine 18, operated with little or no fly wheel effect. This intermittent drive allows the suction to slow the piston's downward movement and accelerate its upward movement, which causes the upward thrust of the piston to be as much stronger than its downward thrust, as the sum of the pull for the time and distance it moved. It will here be noted that the only lift obtained comes from the change in the speed of the weighted piston 15 caused by the upward pull from the propeller. When these upward impulses are rapidly delivered they do not need to hoist or bump their load far at a time to control gravity. It will be noted that the propeller functions for the spread of the wing and the weighted piston for the weight of the wing, permitting the beats to be very rapidly repeated mechanically.

A spring 27 is fastened to the upper end of the shaft 4 and coiled around, and fastened to a cylinder 28 which fits over the upper end of the shaft 4 as shown in Fig. 4. This spring floats the weight of the propeller and parts attached to it, upon the second pull or body of the machine. Thus reserving all of the propeller's pull for the support of the suction.

The control of the second pull is obtained by controlling the light pull of the propeller. This is done by exerting a backward pull on the propeller secured from the weight of second pull, causing it to slip any desired amount of its pull, and decrease its effect on the second pull proportionally.

In the design shown in Figure 3, a type of flying machine is illustrated with a plurality of propellers mounted in this manner for raising the machine vertically and driving its horizontally. It will be understood that the propellers may be mounted so that their positions may be adjusted so that they may be used to drive the machine vertically, horizontally or at any angle.

The cylinder 28 is provided with a head as indicated by the numeral 29, and this cylinder is connected by pipes 30 to compressors 31 operated by eccentrics 32 on the shaft 17, and one of the pipes is provided with a control valve 33 by which the pressure to the cylinder may be controlled. A similar valve may be used in the other pipe if desired. These pipes form a guard around the propeller blade and as many pipes as desired may be used, and as they are essentially a guard and may never be used for compressed air the details of the compressor and cylinder are not shown.

Figure 4 is a detail showing the mounting of the upper end of the propeller shaft.

Having thus fully described the invention, what I claim as new and desire to secure by Letters Patent, is:—

1. In a propelling device of the character described, means for obtaining a resilient connection between a propeller having a rotary motion and a weight having a reciprocatory motion in the axial direction of the propeller, said connection enabling the thrust of the propeller to cause the weight to thrust with greater force forward than backward.

2. In a power device, a propeller, a shaft upon which the propeller is mounted, a piston on the end of the shaft opposite to that upon which the propeller is mounted, means for rotating the propeller, a cylinder in which the piston is mounted, another piston in the said cylinder, means for reciprocating the said latter piston, and means for causing a suction in the said cylinder.

3. In a propelling device of the character described, means for obtaining a resilient connection between a propeller having a rotary motion and a weight having a reciprocatory motion in the axial direction of the propeller, and resilient means for floating the weight of the propeller, said connection enabling the thrust of the propeller to cause the weight to thrust with greater force forward than backward and create a second thrust therefrom.

4. In a propelling device of the character described, a propeller, a reciprocating weight flexibly attached to the said propeller, and means for driving the reciprocating weight with one impulse per cycle.

In testimony whereof he affixes his signature.

WILLIAM J. MASON.